United States Patent Office 3,346,500
Patented Oct. 10, 1967

3,346,500
STABILIZED DIELECTRIC COMPOSITION CONTAINING 2-BROMONAPHTHALENE
George H. Hunt, West Newton, Mass., assignor to Simplex Wire and Cable Company, Cambridge, Mass., a corporation of Massachusetts
No Drawing. Filed Apr. 25, 1966, Ser. No. 544,718
4 Claims. (Cl. 252—63.2)

ABSTRACT OF THE DISCLOSURE

Dielectric compositions are disclosed wherein a voltage stabilizing additive is incorporated into an ethylene or propylene base in a soluble amount between .2 and 2.5% by weight. The voltage stabilizing additives include 2-bromonaphthalene and 1-iodonaphthalene. The olefin base can be a low density polyethylene, a high density polyethylene or a polypropylene, e.g., isotactic polypropylene.

---

This is a continuation-in-part of application Ser. No. 404,489, filed Oct. 16, 1964, now abandoned.

This invention relates to polyethylene solid dielectrics and in particular provides a polyethylene based solid dielectric composition of improved voltage stability.

Polyethylene based solid dielectrics employed as cable insulation or the like, which do not contain some sort of voltage stabilizer, exhibit the disadvantageous property under applied alternating potential that when the applied potential is quickly raised to breakdown the breakdown voltage is substantially higher than when the applied potential is slowly raised and held for a period of time. Typically slow rise breakdown voltages for polyethylene insulation range between 65% and 85% of the quick rise breakdown voltage.

It is a principal object of this invention to provide voltage stability in polyethylene insulation in which the ratio of slow rise breakdown voltage to quick rise breakdown voltage is as high as 1.0 or more thereby increasing the service life of high voltage polyethylene insulation and reducing the amount of insulation required for a given voltage service. This and other objects of this invention are basically achieved by employing small amounts of certain voltage stabilizers which are effective when dispersed in polyethylene based solid dielectric compositions to raise the long time breakdown voltage of such compositions.

It has been found that certain halogenated naphthalenes, i.e., 2-bromonaphthalene and 1-iodonaphthalene exhibit voltage stabilizing properties when incorporated in polyethylene and other solid polymers of lower olefins.

In particular, the additives of the invention have been found effective with low density polyethylene based compositions generally having a density on the order of .92 to about .95 and a melt index between 0.20 and 2.0. Specifically, the polyethylenes to which we refer are those solid polymers of ethylene prepared by the "high pressure" process, although the additives are also useful for the purpose in high density (low pressure) polyethylenes and in polypropylenes. The polyethylene compositions can, of course, contain minor amounts of the usual additives, adjuvants and fillers conventionally employed in polyethylene compositions, such as carbon black, pigments, anti-oxidants, heat stabilizers and ozone resistance stabilizers, and can also contain reactive components, such as cross-linking agents. The voltage stabilizers of our invention are also useful in increasing the voltage stability of polyethylene compositions over a long period of time where the polyethylene compositions contain minor amounts of rubbery polymers and copolymers of such olefins as isobutylene and isoprene.

The proportion of the voltage stabilizer compounds required for significant improvement in voltage stability of polyethylene are about 0.2 to 2.0 or 2.5% by weight based on the amount of polyethylene, and an important property of the compounds used in the practice of the present invention is their solubility in polyethylene which is at least 0.2% by weight in each case. Addition of voltage stabilizers in excess of their solubility in polyethylene causes their crystallization with consequent weakening of the entire structure electrically by creating physical discontinuities, and is therefore to be avoided. The addition of as much as 5% or more of the stabilizers may be harmful to the insulation and therefore should also be avoided.

It is also important that the compounds can be incorporated in the polyethylene without decomposition of the polyethylene or volatilization of the voltage stabilizer compound. Since temperatures on the order of 300 to 400° F. are required for successful blending of polyethylene with other materials, the voltage stabilizer additives of this invention which are liquid and have a low vapor pressure at this temperature range are preferably incorporated in the polyethylene at such temperatures.

Table I presents the results of several tests, each of a series of identical samples, a first series of low density solid polyethylene, a second series of the same polyethylene containing 2% of 2-bromonaphthalene, and a third series of the same polyethylene containing 2% of 1-iodonaphthalene. The results in each case are expressed as the ratio of the number of samples which failed to the total samples in the series. The length of time of the test on the particular series of samples is expressed below the ratio.

TABLE I

| Test Voltage, kv | 20 | 26 | 30 | 40 | 47 |
|---|---|---|---|---|---|
| Blank | 4/6, 5 min. | | | | |
| 2-bromonaphthalene | | | | 0/6, 30 min. | |
| 1-iodonaphthalene | | | 3/8, 1 hr. | | |

The following are further examples of solid dielectric compositions in accordance with the present invention which exhibit high voltage stability:

Example 1

Base—high density polyethylene, M.P. 240–260° F., density .94, prepared by polymerization of ethylene in the presence of a chromia-silica-alumina catalyst at a temperature of 150–450° F. and a pressure of 0 to 700 p.s.i.g.

Additive—2 bromonaphthalene, 1.0% by weight based on polyethylene.

Example 2

Base—isotactic polypropylene, M.P. 310° F., prepared by polymerization of propylene in the presence of titanium tetrachloride and triethyl aluminum at 140° F. and a pressure of 30–150 p.s.i.g.

Additive—1-iodonaphthalene, 0.5% by weight based on polypropylene.

Example 3

Base—low density polyethylene, density .92, melt index 1.5, prepared by the so-called "high pressure" process and similar in all respects to polyethylene A.

Additive—2 bromonaphthalene, 2.5% by weight based on polypropylene.

I claim:
1. A solid dielectric composition consisting essentially of a solid polymer of an olefin selected from the group consisting of ethylene and propylene, said polymer having disposed therein a soluble amount between .2 and 2.5% by weight based on the polymer of 2-bromonaphthalene.

2. The composition of claim 1 in which the polymer is low density polyethylene.

3. The composition of claim 1 in which the polymer is high density polyethylene.

4. The composition of claim 1 in which the polymer is polypropylene.

References Cited

UNITED STATES PATENTS 3,075,040  1/1963  Lemmerich et al. ___ 252—63 X

LEON D. ROSDOL, *Primary Examiner.*

J. D. WELSH, *Examiner.*